United States Patent
Ertl et al.

(10) Patent No.: US 12,049,834 B2
(45) Date of Patent: Jul. 30, 2024

(54) GUIDE BLADE ARRANGEMENT FOR A TURBOMACHINE

(71) Applicant: MTU Aero Engines AG, Munich (DE)

(72) Inventors: Franz-Josef Ertl, Munich (DE); Hans-Peter Hackenberg, Munich (DE); Alexander Buck, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/797,479

(22) PCT Filed: Feb. 23, 2021

(86) PCT No.: PCT/DE2021/000035
§ 371 (c)(1),
(2) Date: Aug. 4, 2022

(87) PCT Pub. No.: WO2021/170167
PCT Pub. Date: Sep. 2, 2021

(65) Prior Publication Data
US 2023/0203958 A1    Jun. 29, 2023

(30) Foreign Application Priority Data
Feb. 26, 2020   (DE) .......................... 102020202441.3

(51) Int. Cl.
*F01D 9/04*    (2006.01)
(52) U.S. Cl.
CPC ........ *F01D 9/041* (2013.01); *F05D 2220/323* (2013.01); *F05D 2240/12* (2013.01)
(58) Field of Classification Search
CPC ...................................................... F01D 9/041
See application file for complete search history.

(56) References Cited

U.S. PATENT DOCUMENTS

| | | | |
|---|---|---|---|
| 2,724,544 A | 11/1955 | William et al. |
| 4,365,933 A | 12/1982 | Langer et al. |
| 8,596,970 B2 | 12/2013 | Speed et al. |
| 9,103,213 B2 | 8/2015 | Barr et al. |

(Continued)

FOREIGN PATENT DOCUMENTS

| | | | |
|---|---|---|---|
| DE | 2849747 A1 | 5/1980 |
| EP | 3103571 A1 | 12/2016 |

(Continued)

OTHER PUBLICATIONS

ISR of PCT/DE2021/000035, dated Jun. 11, 2021.

*Primary Examiner* — Justin D Seabe
*Assistant Examiner* — John S Hunter, Jr.
(74) *Attorney, Agent, or Firm* — Davidson Kappel LLC

(57) ABSTRACT

A guide blade arrangement (20) for a turbomachine (1), including a guide blade airfoil (22) and a platform (21). The guide blade airfoil (22) is situated at a side (21.1) of the platform (21) facing the gas channel, an opposite side (21.2) of the platform (21) facing away from the gas channel being contoured at least in one area (30.1, 30.2) with elevations (25) and depressions (26) that follow one another in the circumferential direction (23) in relation to a longitudinal axis (2) of the turbomachine (1), and the elevations (25) and depressions (26) at the side (21.2) facing away from the gas channel being set via a platform thickness (31), taken radially in each case, that is variable in the circumferential direction (23) and that repeatedly increases and decreases with a continuous profile.

19 Claims, 5 Drawing Sheets

(56) References Cited

U.S. PATENT DOCUMENTS

| | | |
|---|---|---|
| 9,926,806 B2 | 3/2018 | Praisner et al. |
| 10,415,392 B2 | 9/2019 | Lothaus |
| 10,619,515 B2 | 4/2020 | Heinrich et al. |
| 2019/0120059 A1 | 4/2019 | Nash et al. |
| 2020/0032661 A1 | 1/2020 | Tebeka et al. |

FOREIGN PATENT DOCUMENTS

| | | |
|---|---|---|
| EP | 3008291 B1 | 8/2018 |
| WO | WO 2005008032 | 1/2005 |
| WO | WO2015077067 A1 | 5/2015 |

GUIDE BLADE ARRANGEMENT FOR A TURBOMACHINE

TECHNICAL FIELD

The present invention relates to a guide blade arrangement for a turbomachine.

BACKGROUND

The turbomachine may be a jet engine, for example, such as a turbofan engine. The turbomachine is functionally divided into a compressor, a combustion chamber, and a turbine. In the case of the jet engine, for example, aspirated air is compressed by the compressor and combusted with admixed jet fuel in the downstream combustion chamber. The resulting hot gas, a mixture of combustion gas and air, flows through the downstream turbine and is expanded in the process.

SUMMARY OF THE INVENTION

It is an object of the present invention to provide a guide blade arrangement that includes a guide blade airfoil that is situated at a side of a platform facing the gas channel. The platform delimits the gas channel or a segment thereof in the radial direction. The guide blade arrangement may be combined with further, for example structurally identical, guide blade arrangements to form a guide blade ring which is situated in the turbomachine in an axial sequence including rotor blade rings. A guide blade ring and a rotor blade ring may together form a stage, and the compressor and the turbine may in each case be built from multiple such stages.

The present disclosure provides a particularly advantageous guide blade arrangement.

The present invention provides a guide blade arrangement (20) for a turbomachine (1), including
- a guide blade airfoil (22), and
- a platform (21),
  - the guide blade airfoil (22) being situated at a side (21.1) of the platform (21) facing the gas channel,
  - an opposite side (21.2) of the platform (21) facing away from the gas channel being contoured at least in one area (30.1, 30.2) with elevations (25) and depressions (26) that follow one another in the circumferential direction (23) in relation to a longitudinal axis (2) of the turbomachine (1).

The platform of the guide blade arrangement is contoured in the at least in one area, so as to be, provided with elevations and depressions that follow one another in the circumferential direction, at its side facing away from the gas channel. These elevations and depressions provided at the side of the platform facing away from the gas channel are set via a platform thickness that is variable in the circumferential direction and that repeatedly increases and decreases with a continuous profile. The platform thickness is taken radially, and over the contoured area assumes different values along the circumferential direction.

In particular at the transition between the guide blade airfoil and the platform, high mechanical stresses may occur, for example due to large thermal gradients or great stiffness jumps. This may result in a reduced service life, for example. However, the transition area per se is not very amenable to optimization (for example, a thickening of the fillet), and may result, for example, in a tradeoff with the aerodynamic efficiency. In this regard, the present approach uses the contouring of the side of the platform facing away from the gas channel to engage at an aerodynamically noncritical location.

Via the elevations and depressions, the stress level may also decrease at the opposite side facing the gas channel and in particular in the transition area; i.e., the above-described negative effects may be counteracted. The decoupling between aerodynamics and structural mechanics also reflects the fact that the contouring is accompanied by a variable platform thickness. In simplified terms, the contouring facing away from the gas channel is implemented without complementary contouring of the side facing the gas channel, so that the side of the platform facing the gas channel may be optimized for the aerodynamic requirements.

Preferred specific embodiments are set forth in the dependent claims and in the overall description, in the description of the features, a distinction not always being made in particular between device aspects, method aspects, or use aspects; in any case, the disclosure is to be implicitly construed with regard to all claim categories. Thus, the disclosure in particular always relates to the guide blade arrangement as well as to a turbine module that includes same, or corresponding uses.

Within the scope of the present disclosure, the terms "axial," "radial," or "circumferential," as well as the associated directions (axial direction, radial direction, and circumferential direction) refer to the longitudinal axis of the turbomachine, which coincides, for example, with a rotational axis of the rotor blade rings of the turbomachine. "Front" and "rear" refer to the flow direction in the gas channel, where "front" thus means upstream and "rear" means downstream. Within the scope of the present disclosure, "a" and "an," as indefinite articles, are thus always also understood to mean "at least one" unless expressly stated otherwise; thus, for example, multiple guide blade airfoils may also be situated at the platform (see below for a more detailed discussion).

In the contoured area there are multiple elevations and depressions, i.e., at least two elevations and at least two depressions, for example, that follow one another in the circumferential direction. The contouring is set via the variable platform thickness; thus, in any case the opposite side facing the gas channel does not have a complementary contour. The platform thickness has a "continuous profile"; i.e., it does not abruptly change (step function), but, rather, in mathematical terms changes with a constant, in particular constantly differentiable, profile. Quantitatively, this may mean, for example, that between two next-closest maxima of the platform thickness in the circumferential direction, at best there may be one section, having a constant platform thickness, that extends at most over 0.3, 0.2, or 0.1 times the circumferential distance between the next-closest maxima (which preferably applies for all next-closest maxima in each case). There is particularly preferably no such area having a constant platform thickness, and the platform thickness thus changes continuously between the maxima.

The inner platform as well as the outer platform may be optimized via the contouring according to the present invention. The inner platform delimits the gas channel radially inwardly, and its side facing away from the gas channel correspondingly likewise points radially inwardly. In contrast, the outer platform delimits the gas channel radially outwardly, and its side facing away from the gas channel correspondingly likewise points radially outwardly. The guide blade arrangement preferably includes both an inner platform and an outer platform at the guide blade airfoil, and both platforms are then particularly preferably also contoured according to the present invention.

According to one preferred specific embodiment, an amplitude in the contoured area at the elevations and depressions, taken radially in each case, constitutes at least 25%, preferably at least 50%, of an average platform thickness. Possible upper limits of the amplitude, which in general are also to be disclosed independently of a lower limit, but which preferably are used in conjunction therewith, are at most 200%, 150%, or 100% of the average platform thickness (increasingly preferred in the order stated). The latter results as the average value of the platform thicknesses formed over the area in the circumferential direction. The average platform thickness may in particular be ascertained in an axially perpendicular section plane, the amplitude then being considered in the same section plane. The amplitude may result, for example, as a deflection from a curve that is formed as an average value, for example a circular shape that is corrected for the profile of the side facing the gas channel.

In one preferred embodiment, the amplitude of the elevations and depressions in the circumferential direction varies over the contoured area. Thus, for example, an elevation and a depression that follow one another in the circumferential direction may have different amplitudes, and in addition, in particular two successive elevations and/or two successive depressions may have different amplitudes. The change in the amplitudes may once again be considered in particular in an axially perpendicular section plane. The variable amplitude may, for example, be a reflection of the structural mechanical optimization via which an acceptable stress level at the side facing the gas channel is achieved. In addition, a thickening or reinforcement may thus also be limited, for example, to the areas that are actually necessary; conversely, excessive platform thicknesses that are not functionally necessary, and thus, correspondingly high weights, may be prevented (relevant, for example, for the jet fuel consumption of an aircraft engine).

According to one preferred specific embodiment, the absolute value of the amplitude, based on an average amplitude formed over all elevations and depressions of the contoured area, changes by at least 15%, more preferably at least 25% or 30%. Possible upper limits, which once again are also to be disclosed independently of a lower limit, but which preferably are used in combination therewith, for a change may have an absolute value of at most 100%, 75%, or 50% of the average amplitude (increasingly preferred in the order stated). An axially perpendicular section plane is once again preferably considered. A corresponding changed amplitude then results for at least one of the elevations and/or depressions, preferably for multiple elevations and/or depressions. The stated percentage refers to the absolute value; thus, the amplitude may be less or greater than the average amplitude by a corresponding percentage value.

According to one preferred specific embodiment, the front edge and/or the rear edge of the guide blade airfoil have/has an overlap with the contoured area in the radial direction. Similarly, a radial projection of the front edge and/or rear edge onto the side of the guide blade airfoil facing away from the gas channel should be situated in the contoured area. In other words, the contouring, based on the axial position, is thus preferably situated in the area of the rear edge and/or front edge of the guide blade airfoil; an appropriately large area may simultaneously cover the rear edge and the front edge, for example.

According to one preferred specific embodiment, the side of the platform facing the gas channel has a smooth design, at least in areas. The side situated radially opposite from the contoured area may in particular have a smooth design in one area. Alternatively, as stated at the outset, the side facing the gas channel may be contoured, but just not complementarily with the side facing away from the gas channel. The noncomplementary or smooth embodiment may be a reflection of the aerodynamic optimization (however, the structural mechanical contouring according to the present invention does not adversely affect the aerodynamics).

The guide blade arrangement, which may also be referred to as a guide blade cluster, may include one or multiple blades.

The one or multiple blade airfoils of the guide blade arrangement preferably have a one-piece, integral, and/or monolithic design together with the platform, in particular the inner platform and/or outer platform, of the guide blade arrangement, for example may be cast as one piece or generatively manufactured as one piece.

In one preferred embodiment, the guide blade arrangement is a multipart segment; namely, n guide blade airfoils are situated at the platform (where n≥2, and n is a natural number). For example, at least three or four guide blade airfoils may preferably be situated at the platform, and possible upper limits may (independently thereof) be at most 20, 15, or 10 guide blade airfoils, for example.

In one preferred embodiment, the absolute value of a wavelength, with which the elevations and depressions in the contoured area follow one another in the circumferential direction, deviates by no more than 20% from a circumferential distance between next-closest guide blades. In general, the circumferential distances may also vary, in which case the wavelength refers to a circumferential distance that is formed over the segment as an average value. However, the guide blade airfoils are preferably equidistantly situated. Specifically, the circumferential distance is taken between the blade airfoils at their front edges, and in particular radially at the level of the transition area to the platform. The deviation of the wavelength from the circumferential distance may be even less; for example, the absolute value may constitute at most 10% thereof, and the wavelength and the circumferential distance may also be equal (0%).

According to one preferred specific embodiment, total number $Z_E$ of elevations that follow one another in the circumferential direction in the contoured area deviate at most by ±1 from number n of guide blade airfoils, and/or total number $Z_V$ of depressions that follow one another in the circumferential direction in the contoured area deviate at most by ±1 from number n of guide blade airfoils. In other words, $n-1 \leq Z_E \leq n+1$ and/or $n-1 \leq Z_V \leq n+1$ apply/applies. The number of elevations and depressions thus corresponds essentially to number n of guide blade airfoils, for which the inventors have observed good structural mechanical properties (reduction of the stress level).

According to one preferred specific embodiment, the contoured area is situated in a radially open pocket of the platform. In the case of the inner platform, this pocket is radially inwardly open, and for the outer platform it is radially outwardly open. In the circumferential direction the pocket is preferably framed by lateral webs which may be used, for example, for mechanical stabilization or for connection to the neighboring segment, i.e., the mechanical connection to the circumferentially adjacent platform. Such a lateral web may extend in the circumferential direction over at least 3 mm or 5 mm, for example, with possible upper limits of at most 15 mm or 10 mm, for example. The platform thickness may generally be increased in the area of the lateral webs, and may be, for example, at least 2, 3, 4, or 5 times the average platform thickness in the contoured area (with possible upper limits of at most 30, 20, or 15 times, for example).

Alternatively or preferably additionally, the radially open pocket may also be axially framed by a web. The radially open pocket may in each case be framed with a web axially to the front or axially to the rear, preferably both. Such a web may fulfill a sealing function and/or installation function, for example, and may extend, for example, over at least 3 mm or 5 mm in the axial direction, with possible upper limits of at most 15 mm or 10 mm, for example. The platform thickness in the area of the web may be, for example, at least 2, 3, 4, or 5 times the average platform thickness in the contoured area (with possible upper limits of at most 30, 20, or 15 times, for example).

As a whole, the side of the platform facing away from the gas channel may also be provided with multiple pockets axially following one another, at least one of which is provided with the contouring according to the present invention. In the case of an inner platform, for example a middle web that extends in the circumferential direction and that is situated approximately axially centrally at the level of the guide blade airfoils may form an axially front pocket and an axially rear pocket. In the case of an outer platform, for example there may also be multiple pockets axially following one another, which may be axially framed by sealing webs or installation webs. An installation web may carry or form so-called "vane hooks," for example (for suspending the guide blade arrangement on the housing). However, at the side of the outer platform facing away from the gas channel there may also be an axial area at the level of the rear edges that is not framed, either axially to the rear or laterally (circumferentially), by webs. Alternatively or additionally, at the side of the outer platform facing away from the gas channel there may also be an axial area at the level of the front edges that is not framed axially to the front and/or laterally (circumferentially) by webs.

Also independently of these details, the contoured area may extend circumferentially, for example over at least 50%, 60%, or 70% of the circumferential width of the platform. The contoured area may also extend over the entire circumferential width (100%), but there may also be upper limits of, for example, at most 90% or 80% of the circumferential width. The contoured area may axially extend, for example, over at least 20%, 30%, 40%, or 50% of the axial platform length. In turn, the contoured area may extend over the entire axial length (100%), but there may also be upper limits of at most 90% or 80%, for example.

Moreover, the present invention relates to a turbine module that includes a guide blade arrangement provided here, in particular including a guide blade ring that is built from multiple guide blade arrangements. Furthermore, the present invention relates to a turbomachine that includes a guide blade arrangement provided here or a corresponding guide blade ring, in particular including a turbine module mentioned above. The turbomachine may preferably be an aircraft engine, for example a turbofan engine.

BRIEF DESCRIPTION OF THE DRAWINGS

The present invention is explained in greater detail below with reference to one exemplary embodiment, it being possible for the individual features, within the scope of the other independent claims besides the main claim, to also be in some other combination that is essential to the present invention, in particular a distinction also not being made between the different claim categories.

DETAILED DESCRIPTION

Figure 1:
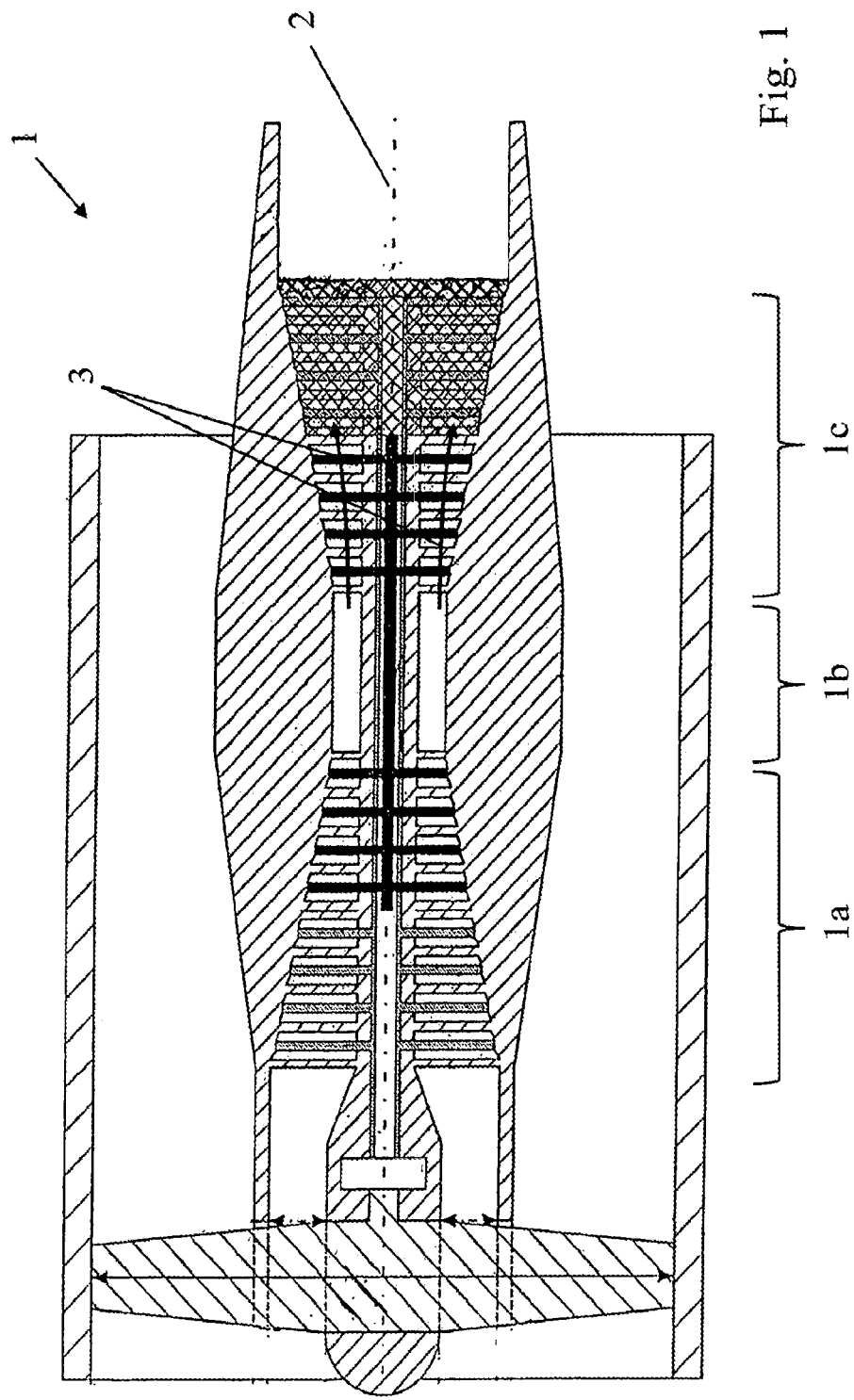
FIG. 1 shows a turbomachine, specifically, a turbofan engine, in an axial section.

FIG. 1 shows a turbomachine 1, specifically, a turbofan engine, in an axial section. Turbomachine 1 is functionally divided into a compressor 1a, a combustion chamber 1b, and a turbine 1c. Compressor 1a and turbine 1c are each built from multiple stages, and each stage is made up of a guide blade ring and a subsequent rotor blade ring. During operation, the rotor blade rings rotate about longitudinal axis 2 of turbomachine 1. The aspirated air is compressed in compressor 1a, and then combusted with admixed jet fuel in downstream combustion chamber 1b. The hot gas flows through hot gas channel 3 and drives the rotor blade rings, which rotate about longitudinal axis 2.

Figure 2:
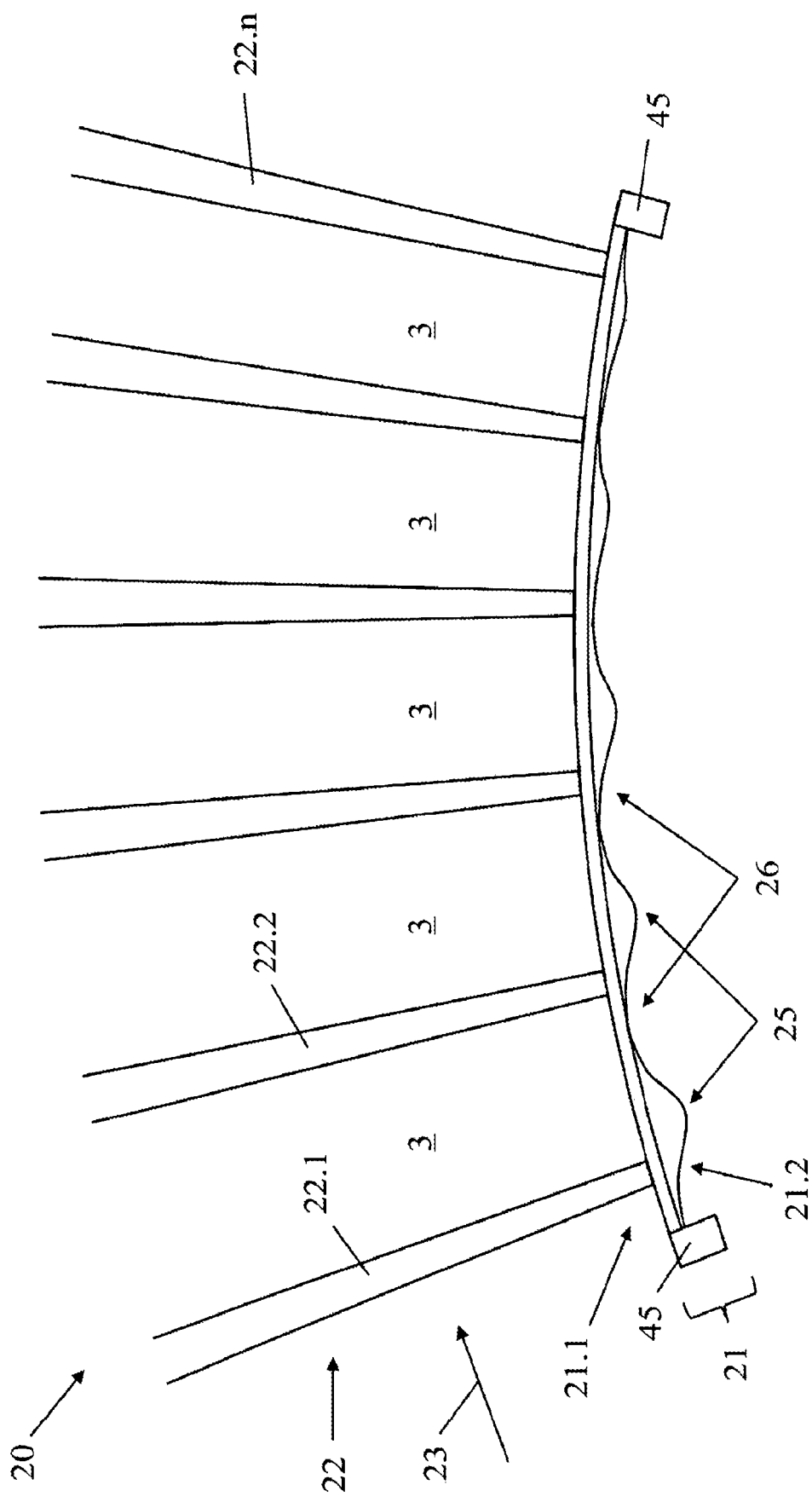
FIG. 2 shows a portion of a guide blade arrangement according to the present invention in a schematic axial view.

FIG. 2 shows a portion of a guide blade arrangement 20 according to the present invention, in particular a platform 21 including multiple guide blade airfoils 22, namely, guide blade airfoils 22.1, 22.2 through 22.n (in the present case, n=6). Guide blade arrangement 20 is combined as a segment with further structurally identical guide blade arrangements (not illustrated), which then, following one another in a circumferential direction 23, jointly form a guide blade ring. In the case of turbine 1c, guide blades 22 are then situated in hot gas channel 3, and the combustion gas or hot gas flows around them during operation.

Guide blades 22 are situated at a side 21.1 of platform 21 facing the gas channel, and radially opposite side 21.2 facing away from the gas channel is contoured. The radially opposite side is formed with elevations 25 and depressions 26, which follow one another in an undulating manner in circumferential direction 23. As described in detail in the introduction to the description, via this contouring at side 21.2 of platform 21 facing away from the gas channel, the mechanical stress level at the opposite side, specifically, at the transition between platform 21 and guide blade airfoils 22, may be reduced.

Figure 3:
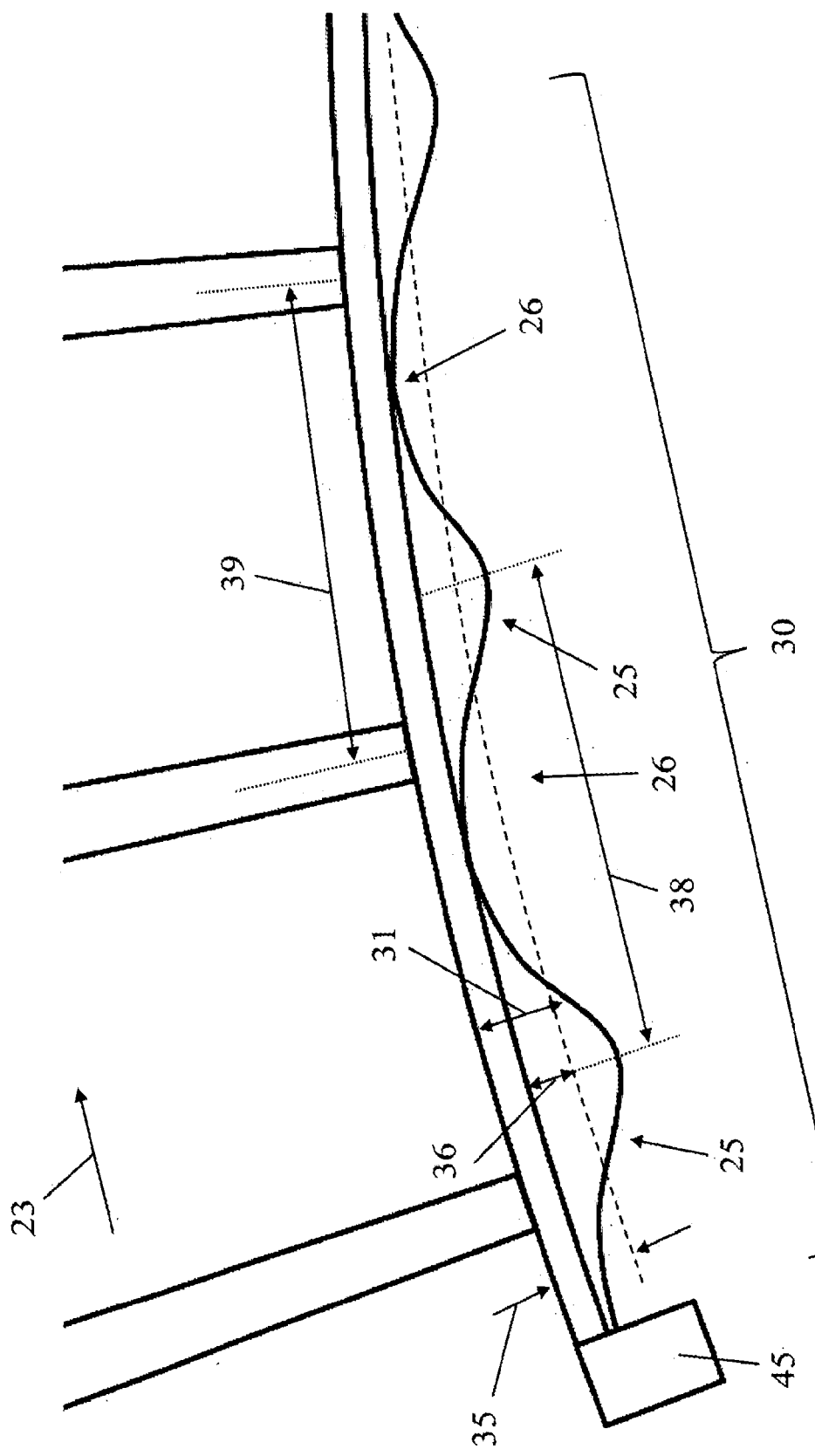
FIG. 3 shows a detailed view of FIG. 2.

As is apparent from FIG. 2 and in particular the detailed view according to FIG. 3, side 21.1 of platform 21 facing the gas channel is not complementarily contoured (in the present case, it has a smooth design). Accordingly, in a contoured area 30 of platform 21, a platform thickness 31 repeatedly increases and decreases in circumferential direction 23. In the present case, platform thickness 31 is greater in the area of elevations 25 and is lesser for depressions 26.

Based on an average platform thickness 35 that is formed as an average value over area 30, an amplitude 36 of the elevations and depressions is between approximately 50% and 100%. Amplitude 36 also changes over contoured area 30; in the present case, it decreases in circumferential direction 23. Based on an average amplitude that is formed over elevations 25 and depressions 26 of contoured area 30, this results in a variation between 30% and 50%. In circumferential direction 23, elevations 25 and depressions 26 follow one another with a wavelength 38 that corresponds approximately to a circumferential distance 39 between guide blade airfoils 22. The number of elevations 25 corresponds approximately (±1) to the number of guide blade airfoils 22; the same applies for the number of depressions 26.

Figure 4A:
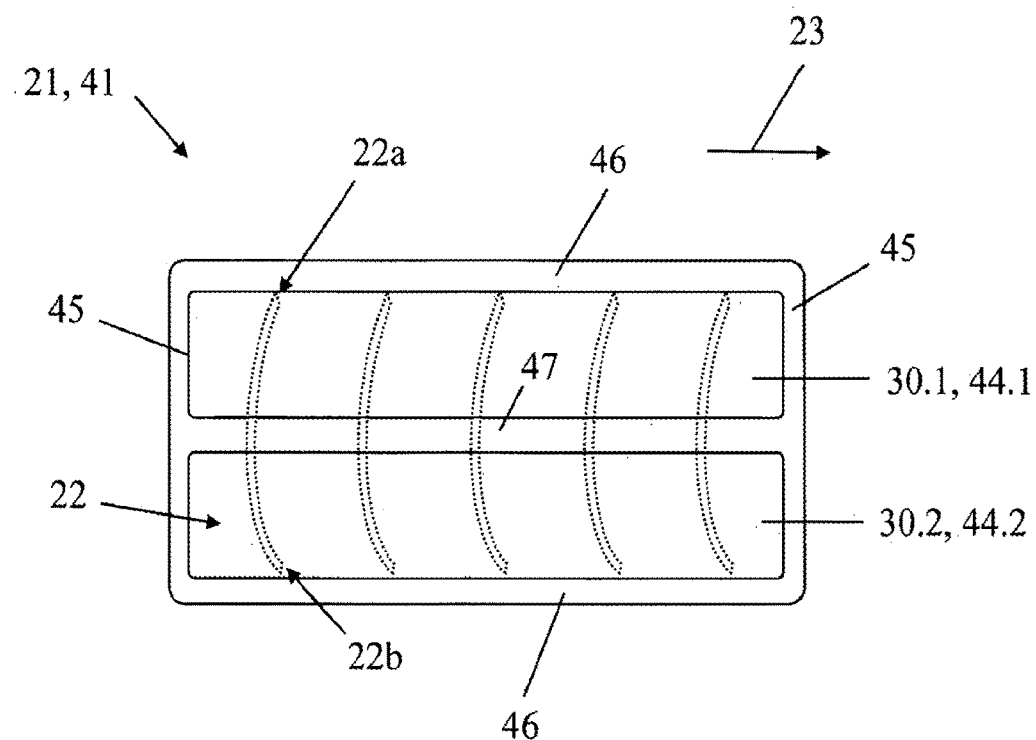
FIG. 4a shows a schematic radial view of the design of an inner platform, without contouring for the sake of clarity.

FIG. 4a shows a platform 21, specifically, an inner platform 41, in a radial view. The viewing direction is radial from the inside to the outside; guide blade airfoils 22 situated at the opposite side (behind the plane of the drawing) are illustrated as dashed lines for purposes of orientation. Their front edges 22a as well as their rear edges 22b (shown only for one guide blade airfoil 22 for the sake of clarity) are apparent. Two contoured areas 30.1, 30.2 according to the above description are formed at inner platform 41, i.e., are formed with elevations and depressions (not shown in FIG. 4a for the sake of clarity). Areas 30.1, 30.2 are formed in so-called pockets 44.1, 44.2 of platform 21, which are framed by lateral webs 45 in circumferential direction 23 (also cf. FIG. 2 for purposes of illustration). Pockets 44.1, 44.2 are axially framed by sealing webs 46; there is also a middle web 47 situated axially between same.

Figure 4B:
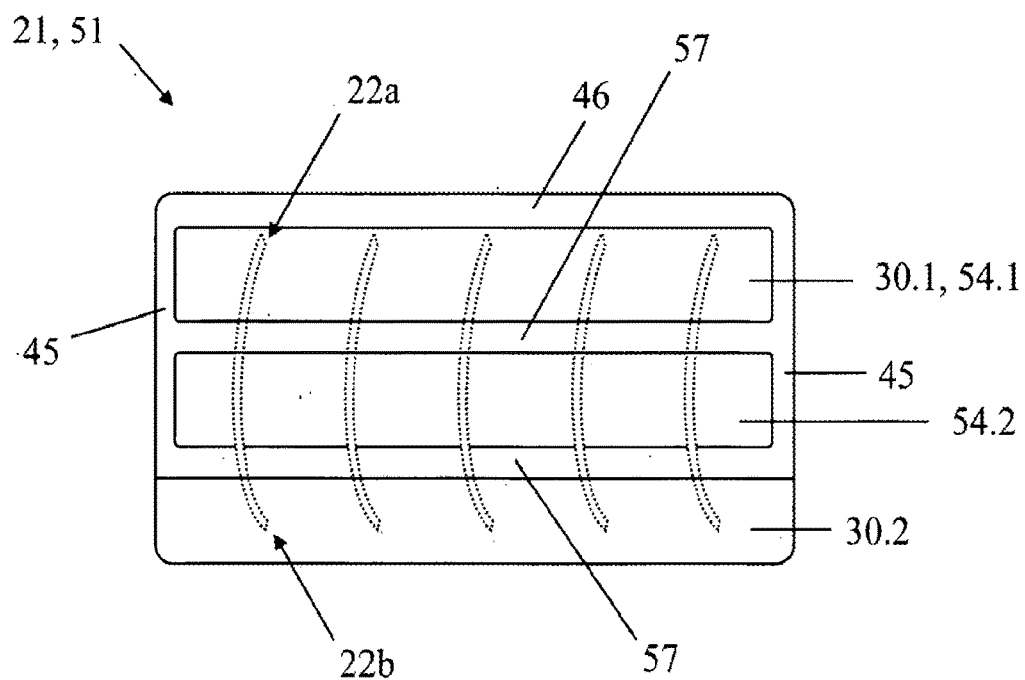
FIG. 4b shows a schematic radial view of the design of an outer platform, without contouring for the sake of clarity.

FIG. 4b likewise shows a platform 21, namely, an outer platform 51. This platform, based on the illustration according to FIG. 2, would be situated radially oppositely, but is not illustrated there for the sake of clarity. Outer platform 51 is also framed with contoured areas 30.1, 30.2 (the contouring is not shown in FIG. 4b), in which the radial projections of front edges 22a and rear edges 22b of guide blade airfoils 22 fall. Contoured area 30.1 is once again a radially open pocket 54.1 (in the present case, radially outwardly open). This pocket is framed by lateral webs 45 in circumferential direction 23, and is axially delimited by sealing web 46 and an installation web 57 with guide blade hooks. A further pocket 54.2, which likewise may, but does not have to, be designed as a contoured area is formed between installation webs 57.

Figure 4C:
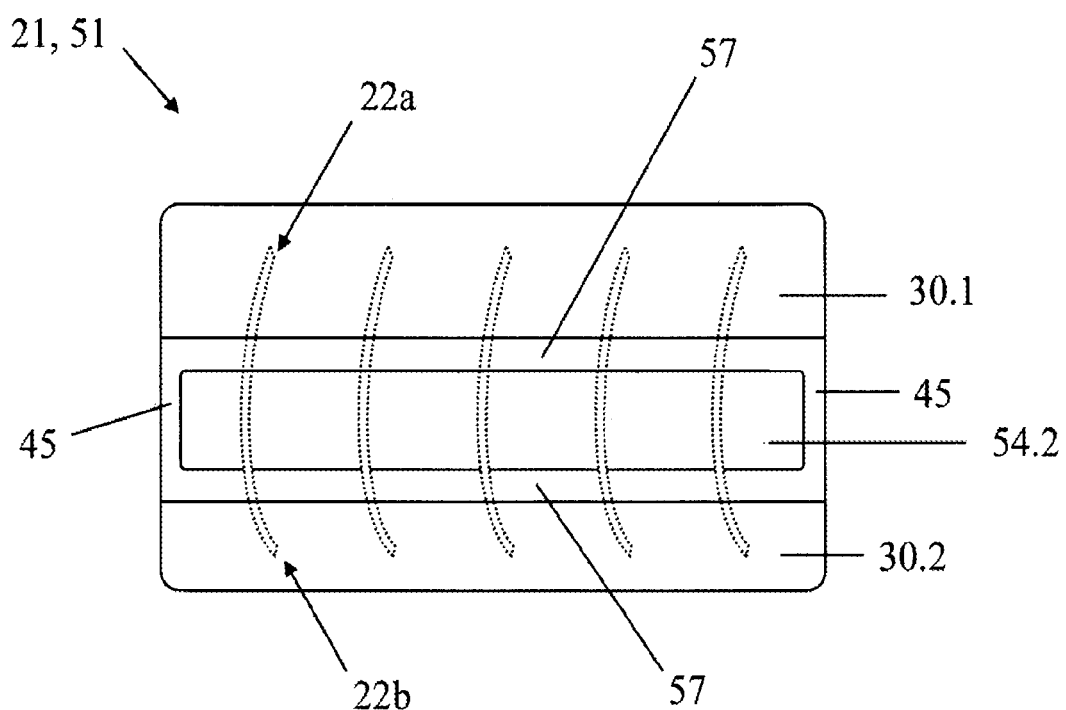
FIG. 4c shows a schematic radial view of the design of an alternative outer platform, without contouring for the sake of clarity.

FIG. 4c likewise shows an outer platform 51; in contrast to FIG. 4b, contoured area 30.1 is not situated in a pocket 54.1 that is delimited axially to the front and to the side by lateral webs 45.

LIST OF REFERENCE NUMERALS 1 turbomachine
1a compressor
1b combustion chamber
1c turbine
2 longitudinal axis
3 hot gas channel
20 guide blade arrangement
21 platform
21.1 side facing the gas channel
21.2 side facing away from the gas channel
22 guide blade airfoils
22a front edge
22b rear edge
22.1, 22.2 through 22.n guide blade airfoils
23 circumferential direction
25 elevations
26 depressions
30 contoured area
30.1, 30.2 contoured areas
31 platform thickness
35 average platform thickness
36 amplitude
38 wavelength
39 circumferential distance
41 inner platform
44.1, 44.2 pockets
45 lateral web
46 sealing web
47 middle web
51 outer platform
54.1, 54.2 pockets
57 installation web

What is claimed is:

1. A guide blade arrangement for a turbomachine, the guide blade arrangement comprising:
a guide blade airfoil; and
a platform having a side facing a gas channel and an opposite side facing away from the gas channel;
the guide blade airfoil being situated at the side of the platform facing the gas channel, the opposite side being contoured at least in one area with elevations and depressions following one another in a circumferential direction in relation to a longitudinal axis of the turbomachine,
the elevations and depressions at the opposite side being set via a platform thickness, taken radially in each case, variable in the circumferential direction and repeatedly increasing and decreasing with a continuous profile in the circumferential direction; wherein the contoured area is situated in a radially open pocket of the platform; the pocket extending circumferentially past at least three of the guide blade airfoils.

2. The guide blade arrangement as recited in claim 1 wherein an amplitude at the elevations and depressions, taken radially in each case, constitutes at least 25% and at most 200% of an average platform thickness formed over the contoured area in the circumferential direction.

3. The guide blade arrangement as recited in claim 1 wherein an amplitude at the elevations and depressions, taken radially in each case, changes over the contoured area in the circumferential direction.

4. The guide blade arrangement as recited in claim 3 wherein the absolute value of the amplitude, based on an average amplitude formed over all elevations and depressions of the contoured area, changes by at least 15% and at most by 100%.

5. The guide blade arrangement as recited in claim 1 wherein the front edge or the rear edge of the guide blade airfoil has a radial overlap with the contoured area so that a radial projection of the front edge or of the rear edge is situated in the contoured area.

6. The guide blade arrangement as recited in claim 1 wherein the side of the platform facing the gas channel has a smooth design, at least in areas.

7. The guide blade arrangement as recited in claim 1 wherein n guide blade airfoils, where n≥3, are situated at the platform.

8. The guide blade arrangement as recited in claim 7 wherein the elevations and depressions in the contoured area follow one another in the circumferential direction with a wavelength whose absolute value deviates by no more than 20% from a circumferential distance between next-closest of the n guide blades in each case.

9. The guide blade arrangement as recited in claim 7 wherein a total number $Z_E$ of elevations following one another in the circumferential direction in the contoured area or a total number $Z_V$ of depressions following one another in the circumferential direction in the contoured area is in a range between n−1 and n+1 so that n−1≤$Z_E$≤n+1 or n−1≤$Z_V$≤n+1.

10. The guide blade arrangement as recited in claim 1 wherein the pocket of the platform is circumferentially framed in each case by a lateral web.

11. The guide blade arrangement as recited in claim 1 wherein the pocket of the platform is axially framed by a sealing web, a middle web or an installation web.

12. A turbine module comprising the guide blade arrangement as recited in claim 1.

13. A turbomachine comprising the guide blade arrangement as recited in claim 1.

14. An aircraft engine comprising the turbomachine as recited in claim 13.

15. The guide blade arrangement as recited in claim 1 wherein the pocket of the platform is open in a radially inward direction.

16. The guide blade arrangement as recited in claim 1 wherein the pocket of the platform is open in a radially inward direction.

17. The guide blade arrangement as recited in claim 1 wherein a further contoured area is further situated in a second radially inward pocket spaced axially from the pocket.

18. The guide blade arrangement as recited in claim 17 wherein the pocket and the further pocket are completely surrounded by webs.

19. The guide blade arrangement as recited in claim 1 wherein the pocket is completely surrounded by webs.

* * * * *